May 7, 1935.  F. V. CLANCY  2,000,011

BRAKE SHOE EXPANDER

Filed July 2, 1934

INVENTOR
Fred V. Clancy
John A. Naismith
ATTORNEY

Patented May 7, 1935

2,000,011

UNITED STATES PATENT OFFICE 2,000,011

BRAKE SHOE EXPANDER

Fred V. Clancy, San Jose, Calif.

Application July 2, 1934, Serial No. 733,461

1 Claim. (Cl. 188—78)

In certain models of motor vehicles the front wheel brakes include a pair of shoes which are expanded by means of a wedge inserted between the two opposing ends of the shoes and operating against rollers mounted on said ends. The wedge is provided with a slot that engages a stationary pin, and the pin is provided with right-hand threads on both ends to receive nuts for securing it in position, with the result that the act of fastening the pin operates to slightly tilt the wedge. When, therefore, force is applied to the wedge to force it downwardly in practical operation, its pressure is unequally divided between the shoes, thereby causing imperfect braking.

It is one object of the invention, therefore, to provide an expanding means of the character indicated that will operate accurately and smoothly, and that will distribute the pressure equally between the two shoes at all times and under all conditions, thereby materially lengthening the useful life of the several parts and greatly increasing the efficiency of the braking mechanisms.

It is another object of the invention to provide an expanding means that will operate with greatly increased efficiency but in which the operating power applied may be greatly reduced.

It is also an object of the invention to provide an expanding means of the character indicated that will be economical to manufacture, simple in form and construction, quickly and easily insertable between the operating pin and the shoes of the braking mechanism referred to, strong, durable, and highly efficient in its practical application.

Figure 1:
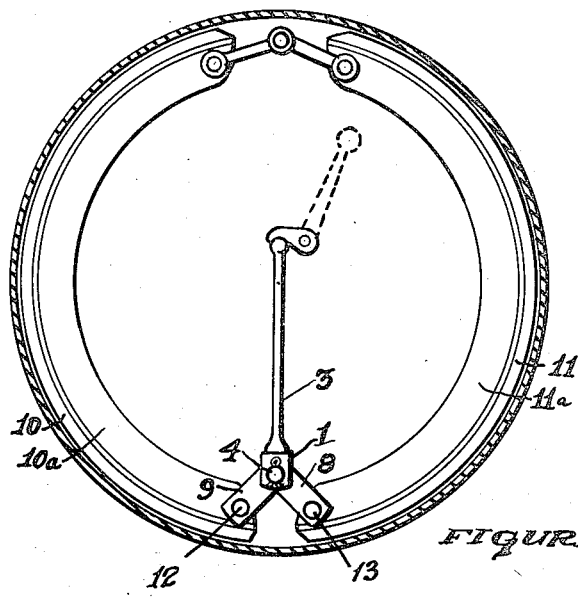
Figure 1 is a sectional view through a brake drum showing a device embodying my invention in an operative position relative to the working parts.
Figure 2:
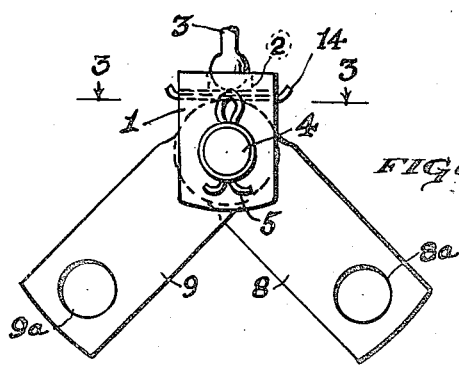
Figure 2 is a full-sized elevation of a device embodying my invention.
Figure 3:
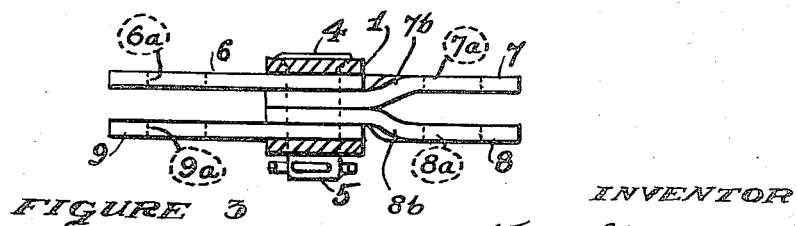
Figure 3 is a section on line 3—3 of Figure 2.

In the preferred embodiment of my invention as shown I provide a yoke 1 of not less than one-eighth of an inch in thickness and having a hole as 2 formed in the center of its top portion and of such a size as to snugly receive the bulbous end of the operating pin now forming a part of the braking mechanism and indicated in part at 3. At 4 is shown a pin passing laterally through the sides of the yoke and held in place by a cotter pin 5.

At 6, 7, 8 and 9 are four arms pivotally mounted on the pin 4 and having bearings formed in their outer ends as at 6a, 7a, 8a, and 9a. These arms are pivotally connected to the shoes 10 and 11 by means of bolts as 12 and 13 journaled in their opposing ends. These four arms are disposed in, and swing in, parallel planes, the arms 7 and 8 being offset at 7b and 8b to bring their end portions in alignment with the outer end portions of arms 6 and 9, whereby to form a fork engaging either side of the rib 11a on shoe 11 in the same manner as the arms 6 and 9 engage the rib 10a on shoe 10.

In the installation of this device it is only necessary to remove the rollers now found on the opposing ends of the two shoes and the cooperating parts inserted therebetween and mount the above described device thereon in place of said rollers. Instead of the pin 3 seating on the wedge it is now seated in the hole 2 in the top of yoke 1. A piece of spring metal 14 is inserted between the head portions of the arms 6, 7, 8, 9 and the top portion of the yoke to receive the thrust of the pin 3. This plate is bent upwardly on each end to secure it permanently in position. The insertion of this plate permits free operation of the several arms and yet prevents undue wearing of the parts, distributing the pressure over all four arms directly instead of through the medium of the sides of the yoke and the pin 4.

By means of the construction described the force applied through pin 3 is transmitted directly to the arms 6 to 9 and thence conveyed equally in both directions to the shoes 10, 11.

A particular advantage of this construction is that it may be quickly and easily substituted for the existing device by merely removing the old device and mounting this one in its place without performing any mechanical fitting and adjusting operations.

It is to be understood, of course, that while I have herein shown and described but one specific embodiment of the invention, changes in form, construction, and method of assembly and operation may be made within the scope of the appended claim.

I claim:

An expander adapted to be inserted between the opposing ends of a pair of brake shoes on a vehicle and to be actuated by a push-rod co-operating therewith and comprising, a yoke having a hole formed in its head to slidably receive the adjacent end of the said rod, a pin passing transversely through the side portions of said yoke, arms pivotally mounted on the pin within the yoke and means for connecting the same to the adjacent ends of the said shoes, and a plate mounted in the yoke and inserted between the push-rod and said arms.

FRED V. CLANCY.